(12) United States Patent
Wong et al.

(10) Patent No.: US 8,552,986 B2
(45) Date of Patent: Oct. 8, 2013

(54) SCALABLE CONTROLLER FOR A COMPUTER INPUT AREA

(75) Inventors: Chee-Heng Wong, Singapore (SG); Deng-Peng Chen, Singapore (SG)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 2625 days.

(21) Appl. No.: 11/216,860

(22) Filed: Aug. 31, 2005

(65) Prior Publication Data

US 2007/0046624 A1    Mar. 1, 2007

(51) Int. Cl.
*G06F 3/041* (2006.01)
(52) U.S. Cl.
USPC .......................................................... 345/173
(58) Field of Classification Search
USPC ................................ 345/173–176; 178/18.01
See application file for complete search history.

(56) References Cited

U.S. PATENT DOCUMENTS

| 4,905,174 | A | * | 2/1990 | Ouchi | 708/141 |
| 5,162,783 | A | * | 11/1992 | Moreno | 345/175 |
| 6,478,432 | B1 | * | 11/2002 | Dyner | 359/858 |
| 6,930,670 | B2 | * | 8/2005 | Chao et al. | 345/168 |
| 7,199,788 | B2 | * | 4/2007 | Ise et al. | 345/173 |

* cited by examiner

*Primary Examiner* — Chanh Nguyen
*Assistant Examiner* — Tsegaye Seyoum

(57) ABSTRACT

In one embodiment, a scalable controller for a computer input area is provided with: a plurality of drive signal pads; a plurality of signal detection pads; a programmable memory to store an indication of active ones of the drive signal pads and signal detection pads; and control circuitry to identify user input with the computer input area by 1) driving active ones of the drive signal pads, and 2) reading active ones of the signal detection pads.

21 Claims, 4 Drawing Sheets

SCALABLE CONTROLLER FOR A COMPUTER INPUT AREA

BACKGROUND

Computer systems such as personal computers, personal digital assistants, automated teller machines and mobile phones may be controlled in a plurality of ways. One way to control a computer system is via an optical (e.g., infrared) touch panel. Optical touch panels are especially advantageous in applications that require 100% transparency and zero touch force (e.g., in liquid crystal display (LCD) applications).

Most optical touch panels comprise a plurality of intersecting optical detection paths, each of which is formed between an optical emitter and an optical detector (often referred to as an emitter/detector pair). Given that different applications require optical touch panels of different size, aspect ratio and resolution, optical touch panels are manufactured with varying numbers and aspect ratios of emitter/detector pairs.

Typically, optical touch panels having different numbers and aspect ratios of emitter/detector pairs are supported by different controllers.

SUMMARY OF THE INVENTION

In one embodiment, a scalable controller for a computer input area comprises a plurality of drive signal pads, a plurality of signal detection pads, a programmable memory and scanning control circuitry. The programmable memory stores one or more indications of active ones of the drive signal pads and the signal detection pads. The scanning control circuitry identifies user interactions with the computer input area by 1) driving active ones of the drive signal pads, and 2) reading active ones of the signal detection pads, in accord with a scan sequence tailored to the active ones of the drive signal pads and the signal detection pads.

In another embodiment, a computer input system comprises a computer input area and a scalable controller. The scalable controller is coupled to the computer input area and comprises a plurality of drive signal pads, a plurality of signal detection pads, a programmable memory and scanning control circuitry. The programmable memory stores one or more indications of active ones of the drive signal pads and the signal detection pads. The scanning control circuitry identifies user interactions with the computer input area by 1) driving active ones of the drive signal pads, and 2) reading active ones of the signal detection pads, in accord with a scan sequence tailored to the active ones of the drive signal pads and the signal detection pads.

In yet another embodiment, a method of controlling a computer input area comprises providing a scalable controller comprising a plurality of drive signal pads and signal detection pads. A subset of the drive signal pads and signal detection pads is then coupled to a computer input area; and a memory of the scalable controller is programmed to designate pairs of the scalable controller's drive signal pads and signal detection pads coupled to the computer input area as "active".

Other embodiments are also disclosed.

BRIEF DESCRIPTION OF THE DRAWINGS

Illustrative embodiments of the invention are illustrated in the drawings, in which.

DETAILED DESCRIPTION

Figure 1:
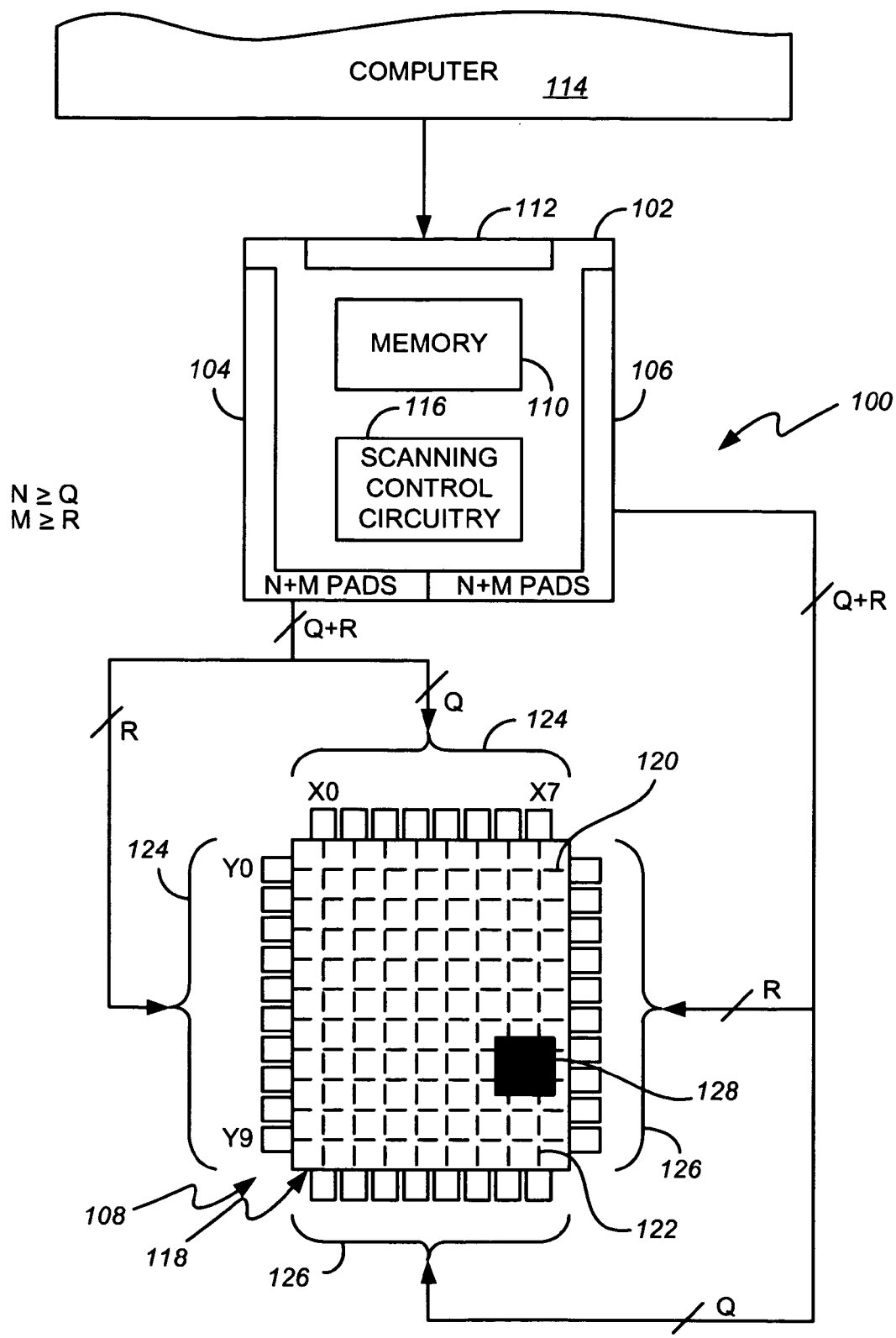
FIG. 1 illustrates a first exemplary computer input system comprising a scalable controller.

As mentioned in the Background, optical touch panels having different numbers and aspect ratios of emitter/detector pairs are typically supported by different controllers. However, it would be less costly if optical touch panel designers, manufacturers and distributors could use a single controller to control optical touch panels having different numbers and aspect ratios of emitter/detector pairs. FIG. 1 therefore illustrates a computer input system 100 comprising a scalable controller 102.

The scalable controller 102 comprises a plurality of (N+M) drive signal pads 104 and a plurality (N+M) of signal detection pads 106. In some cases, only a subset of the controller's pads 104, 106 may be coupled to a computer input area 108 (i.e., Q+R pads, with N≥Q and M≥R). However, an advantage of the controller 102 is that it can be configured for use with computer input areas having a variety of different numbers and aspect ratios of input detection paths. As a result, when the controller 102 is used in different applications, different numbers of its pads 104, 106 may be coupled to a computer input area. And, in some cases, all of the controller's pads 104, 106 may be coupled to a computer input area.

A programmable memory 110 of the controller 102 stores one or more indications of the "active" ones of the pads 104, 106. In most cases, the active ones of the pads 104, 106 will be those of the pads 104, 106 that are coupled to the computer input area 108.

The memory 110 may be programmed in a variety of ways. In one embodiment, the memory 110 is programmed via an external command interface 112 (such as a Universal Asynchronous Receiver Transmitter (UART)) of the controller 102. By way of example, the device that programs the memory 110 may be a computer 114, and the computer 114 may program the memory 110 by executing software (e.g., a software driver) that causes the computer 114 to send a configuration command to the controller's command interface 112.

Figure 2:
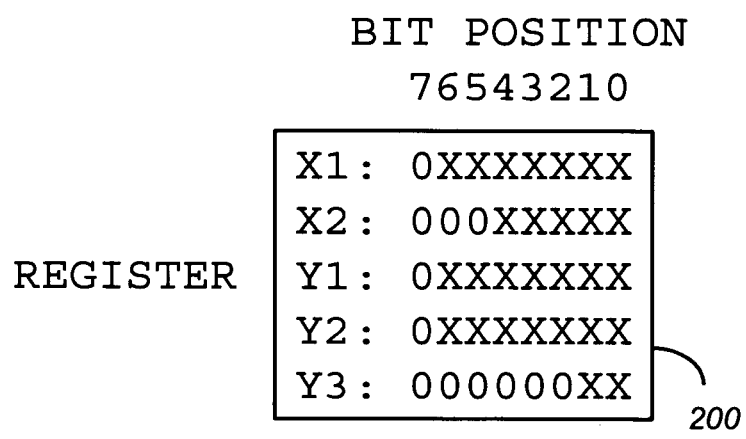
FIG. 2 illustrates one exemplary embodiment of the programmable memory of the FIG. 1 controller.

FIG. 2 illustrates one exemplary embodiment 200 of the memory 110. As shown, the memory 200 comprises a number of registers (e.g., X1, X2, Y1, Y2 and Y3), each of which comprises a plurality of bits (e.g., bits 0 . . . 7). In one embodiment, the states of only some of the bits (e.g., those designated with the contents "X") provide indications of which of the controller's pads 104, 106 are active. Also, and in the same or different embodiment, each of the bits in the registers X1, X2, Y1, Y2 and Y3 (or at least those bits that are used to indicate the status of the controller's pads 104, 106) indicates an active or inactive state of a pair of: one drive signal pad 104 and one signal detection pad 106. The registers may be written via the command interface 114 (FIG. 1).

The controller 102 further comprises scanning control circuitry 116. In response to the indication(s) stored in the memory 110, the scanning control circuitry 116 identifies user interactions with the computer input area 108 by 1) driving active ones of the drive signal pads 104, and 2) reading active ones of the signal detection pads 106.

In one embodiment, and as shown in FIG. 1, the computer input area 108 may take the form of an optical input area 118, such as an optical touch panel. If the computer input area 108 is an optical input area 118, it may comprise a plurality of optical detection paths (e.g., paths 120 and 122), each of which extends between one of a plurality of light emitting elements 124 and one of a plurality of optical detectors 126 (i.e., between an emitter/detector pair). Preferably, the optical detection paths 120, 122 are subdivided into first and second sets arranged along first and second axes. In this manner, the optical detection paths 120, 122 are caused to intersect, and the controller 102 can identify the precise location of a user's interaction 128 with the optical input area 118. In alternate embodiments (not shown), a plurality of optical detection paths could be arranged such that they do not intersect. This latter arrangement might be useful, for example, if an optical input area comprises a plurality of selection areas that are arranged in a single row or column (as might be the case with a touch panel for a lock capable of receiving combinations comprised of only five different digits).

When a computer input area 108 comprises first and second intersecting sets of input detection paths 120, 122, pairs of the drive signal and signal detection pads 104, 106 may likewise be subdivided into first and second sets. The scanning control circuitry 116 may then tailor its scan sequence to scan all the active pairs of one pad set (e.g., pairs X0 . . . X7), followed by all the active pairs of the other pad set (e.g., pairs Y0 . . . Y9).

The controller 102 may be configured, and may be coupled to the computer input area 108, in a variety of ways. In FIG. 1, the controller 102 is presumed to comprise circuitry for generating analog drive signals at the drive signal pads 104, and circuitry for receiving analog detection signals at the signal detection pads 106. In this configuration, active ones of the controller's drive signal pads 104 may be coupled directly to the light emitting elements 124 or other signal generating elements of the computer input area 108. Similarly, the controller's signal detection pads 106 may be coupled directly to the optical detectors 126 or other signal detecting elements of the computer input area 108.

Figure 3:
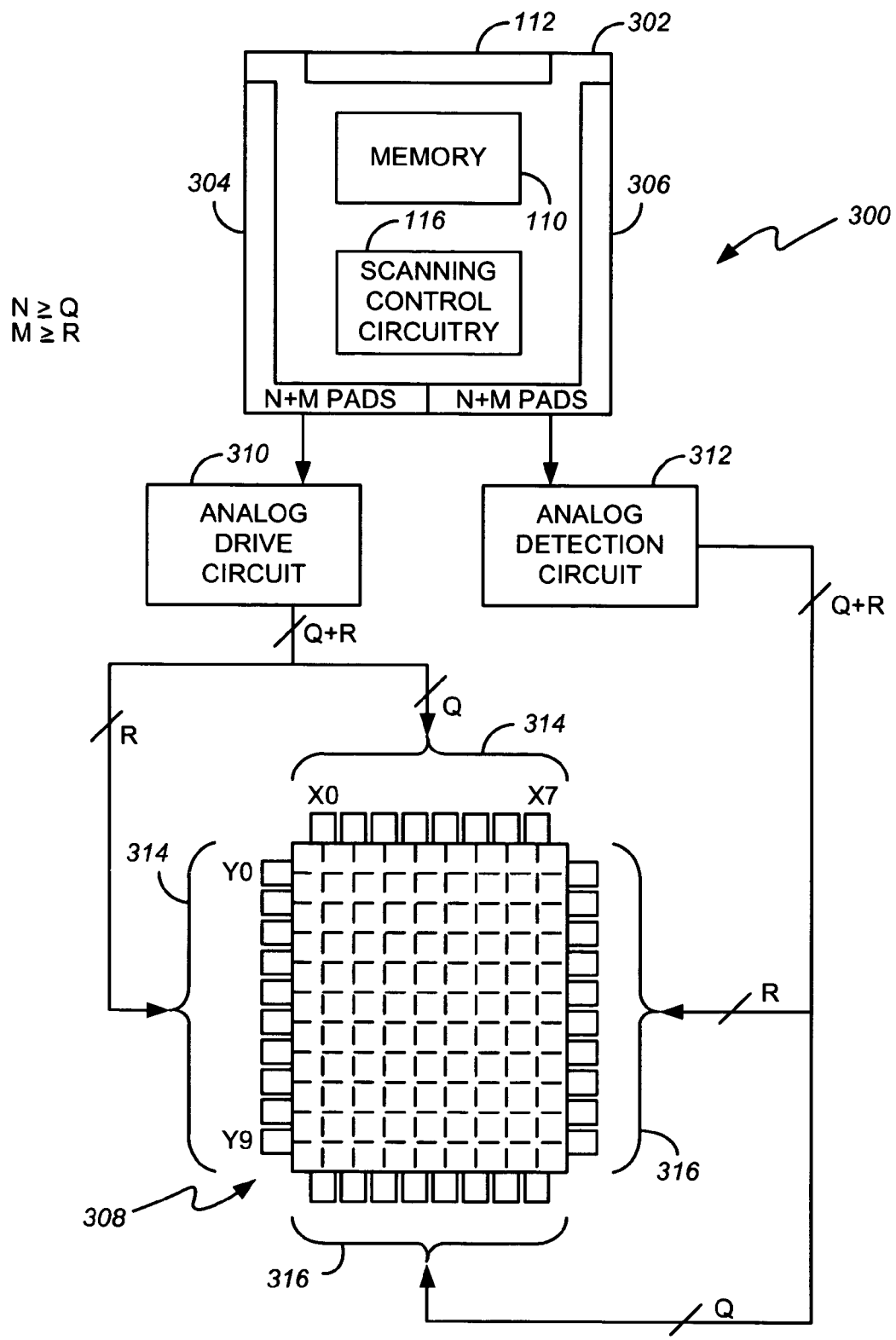
FIG. 3 illustrates a second exemplary computer input system comprising a scalable controller.

FIG. 3 illustrates an alternate controller 302. In contrast to the controller 102, the controller 302 comprises circuitry for generating digital control signals at the drive signal pads 304, and circuitry for receiving digital control signals at the signal detection pads 306. To connect the controller 302 to the computer input area 308, the computer input system 300 comprises one or more analog drive circuits 310, 312 that are implemented apart from the controller 302. In FIG. 3, and by way of example, an analog drive circuit 310 is coupled between the active ones of the drive signal pads 304 and the light emitting elements 314 (or other signal generating elements) of the computer input area 308. In response to digital control signals received via the drive signal pads 304, the analog drive circuit 310 generates analog drive signals for the light emitting elements 314 (or other signal generating elements) of the computer input area 308.

The computer input system 300 also comprises an analog detection circuit 312. The analog detection circuit 312 is coupled between the optical detectors 316 (or other signal detecting elements) of the computer input area 308 and the active ones of the signal detection pads 306. In response to analog detection signals received from the optical detectors 316 (or other signal detecting elements) of the computer input area 308, the analog detection circuit 312 provides digital control signals to the active ones of the signal detection pads 306.

In alternate embodiments of the computer input system 300, more or fewer analog circuits may be provided. For example, a separate analog circuit could be provided for each pad 304, 306, or for discrete subsets of pads 304, 306. Alternately, the analog drive circuit 310 and analog detection circuit 312 could be combined in a single application-specific integrated circuit (ASIC).

By way of example, the controllers 102 and 302 may be implemented via microprocessor or field-programmable gate array (FPGA) technologies.

Figure 4:
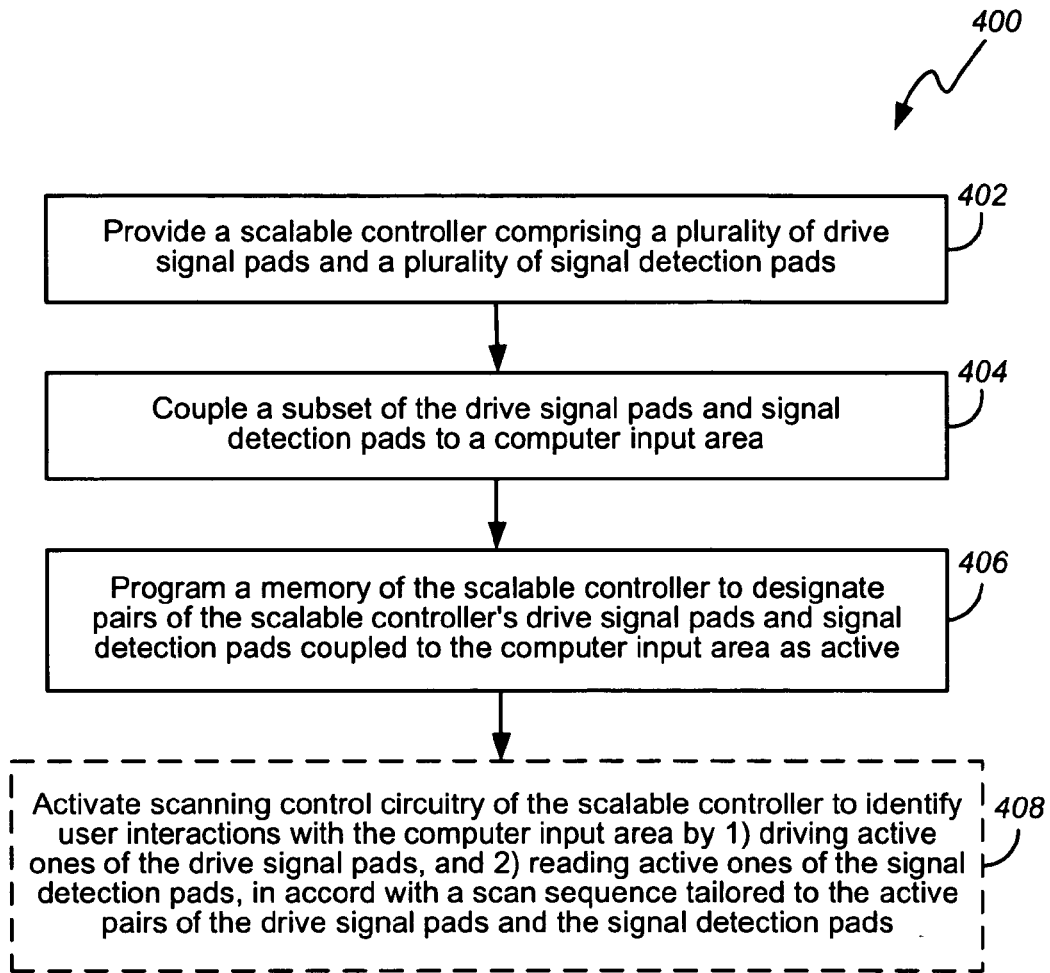
FIG. 4 illustrates an exemplary method for controlling a computer input area such as that which is shown in FIG. 1 or FIG. 3.

FIG. 4 illustrates an exemplary method 400 for controlling a computer input area. The method 400 commences with the provision 402 of a scalable controller comprising a plurality of drive signal pads and a plurality of signal detection pads. A subset of the controller's drive signal pads and signal detection pads are then coupled 404 to a computer input area; and a memory of the scalable controller is programmed 406 to designate pairs of the scalable controller's drive signal pads and signal detection pads (i.e., those coupled to the computer input area) as "active". Although the programming of the memory will typically be done after the controller is coupled to the computer input area, the programming may sometimes be done in advance (e.g., during manufacture or configuration of the controller).

Optionally, the method 400 may proceed with the activation 408 of scanning control circuitry of the scalable controller. In this manner, user interactions with the computer input area may be identified by 1) driving active ones of the drive signal pads, and 2) reading active ones of the signal detection pads, in accord with a scan sequence tailored to the active pairs of the drive signal pads and the signal detection pads.

What is claimed is:

1. A scalable controller for a computer input area, the scalable controller comprising:
   a plurality of drive signal pads;
   a plurality of signal detection pads;
   a programmable memory to store one or more indications of active ones of the drive signal pads and the signal detection pads, wherein the active ones of the drive signal pads and the signal detection pads are coupled to corresponding emitter/detector pairs of the computer input area, and inactive ones of the drive signal pads and the signal detection pads are not coupled to the emitter/detector pairs of the computer input area; and
   scanning control circuitry to identify user interactions with the computer input area by i) driving active ones of the drive signal pads, and ii) reading active ones of the signal detection pads, in accord with a scan sequence tailored to the active ones of the drive signal pads and the signal detection pads.

2. The scalable controller of claim 1, further comprising an external command interface; wherein the programmable memory is programmable via the external command interface.

3. The scalable controller of claim 1, wherein the programmable memory comprises a number of registers; wherein the one or more indications of active ones of the drive signal pads and the signal detection pads comprise a plurality of bits of the number of registers; and wherein each of the plurality of bits indicates an active or inactive state of a pair of one of the drive signal pads and one of the signal detection pads.

4. The scalable controller of claim 3, further comprising an external command interface; wherein the number of registers is writeable via the external command interface.

5. The scalable controller of claim 1, wherein pairs of the drive signal pads and the signal detection pads are subdivided into first and second sets corresponding to first and second intersecting sets of input detection paths of the computer input area; and wherein the scanning control circuitry tailors the scan sequence to scan the active pairs of the first set, followed by the active pairs of the second set.

6. The scalable controller of claim 1, wherein the scalable controller i) generates analog drive signals at the drive signal pads, and ii) receives analog detection signals at the signal detection pads.

7. The scalable controller of claim 1, wherein the scalable controller i) generates digital control signals at the drive signal pads, and ii) receives digital control signals at the signal detection pads.

8. A computer input system, comprising:
a computer input area; and
a scalable controller, coupled to the computer input area, to match an aspect ratio of the computer input area, the scalable controller comprising,
a plurality of drive signal pads;
a plurality of signal detection pads;
a programmable memory to store one or more indications of active ones of the drive signal pads and the signal detection pads, wherein the active ones of the drive signal pads and the signal detection pads are coupled to corresponding emitter/detector pairs of the computer input area, and inactive ones of the drive signal pads and the signal detection pads are not coupled to the emitter/detector pairs of the computer input area; and
scanning control circuitry to identify user interactions with the computer input area by i) driving active ones of the drive signal pads, and ii) reading active ones of the signal detection pads, in accord with a scan sequence tailored to the active ones of the drive signal pads and the signal detection pads.

9. The computer input system of claim 8, wherein the computer input area is an optical input area.

10. The computer input system of claim 9, wherein:
the computer input area comprises pairs of light emitting elements and optical detectors;
the active ones of the drive signal pads of the scalable controller are coupled to the light emitting elements; and
the active ones of the signal detection pads of the scalable controller are coupled to the optical detectors.

11. The computer input system of claim 9, wherein the computer input area comprises pairs of light emitting elements and optical detectors; the computer input system further comprising:
at least one analog drive circuit, coupled between the active ones of the drive signal pads of the scalable controller and the light emitting elements, to generate analog drive signals for the light emitting elements in response to digital control signals received from the active ones of the drive signal pads; and
at least one analog detection circuit, coupled between the optical detectors and the active ones of the signal detection pads, to provide digital control signals to the active ones of the signal detection pads in response to analog detection signals received from the optical detectors.

12. The computer input system of claim 8, wherein the computer input area is an optical touch panel.

13. The computer input system of claim 8, wherein the scalable controller further comprises an external command interface; and wherein the programmable memory is programmable via the external command interface.

14. The computer input system of claim 8, wherein the programmable memory of the scalable controller comprises a number of registers; wherein the one or more indications of active ones of the drive signal pads and the signal detection pads comprise a plurality of bits of the number of registers; and wherein each of the plurality of bits indicates an active or inactive state of a pair of one of the drive signal pads and one of the signal detection pads.

15. The computer input system of claim 14, wherein the scalable controller further comprises an external command interface; and wherein the number of registers is writeable via the external command interface.

16. The computer input system of claim 8, wherein pairs of the drive signal pads and the signal detection pads are subdivided into first and second sets corresponding to first and second intersecting sets of input detection paths of the computer input area; and wherein the scanning control circuitry tailors the scan sequence to scan the active pairs of the first set, followed by the active pairs of the second set.

17. A method of controlling a computer input area, comprising:
providing a scalable controller comprising a plurality of drive signal pads and a plurality of signal detection pads;
coupling a subset of the drive signal pads and signal detection pads to the computer input area to match an aspect ratio of the computer input area, wherein remaining ones of the drive signal pads and the signal detections pads are not coupled to the computer input area; and
programming a memory of the scalable controller to designate pairs of the drive signal pads and the signal detection pads coupled to the computer input area as active.

18. The method of claim 17, further comprising, activating scanning control circuitry of the scalable controller to identify user interactions with the computer input area by i) driving active ones of the drive signal pads, and ii) reading active ones of the signal detection pads, in accord with a scan sequence tailored to the active pairs of the drive signal pads and the signal detection pads.

19. The method of claim 17, wherein the memory of the scalable controller is programmed by writing the memory via an external command interface.

20. The method of claim 17, wherein the memory of the scalable controller is programmed by writing a plurality of bits maintained in a number of registers of the scalable controller's memory.

21. The method of claim 17, wherein the memory of the scalable controller is programmed via software of a computer system to which the computer input area and the scalable controller are connected.

\* \* \* \* \*